(12) United States Patent
Brown (10) Patent No.: US 8,254,055 B2
(45) Date of Patent: Aug. 28, 2012

(54) APPARATUS, SYSTEM, AND METHOD FOR CONTROLLING OUT-GASSING AND HUMIDITY IN A CLOSED SPACE-CONSTRAINED ENVIRONMENT

(75) Inventor: Charles A. Brown, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1172 days.

(21) Appl. No.: 11/934,571

(22) Filed: Nov. 2, 2007

(65) Prior Publication Data

US 2009/0116141 A1    May 7, 2009

(51) Int. Cl.
*G11B 33/14* (2006.01)
*B29C 51/10* (2006.01)
*B01D 53/02* (2006.01)
*B29C 41/46* (2006.01)
*B29C 43/02* (2006.01)
*B29C 51/42* (2006.01)

(52) U.S. Cl. ............ 360/97.12; 264/319; 264/322; 96/134

(58) Field of Classification Search ............ 96/4, 108, 96/118, 134; 55/522; 95/90, 116, 117; 360/97.02–97.03, 97.12, 97.16; 720/648; 264/299, 316, 319, 320, 322, 328.14, 553, 264/554

See application file for complete search history.

(56) References Cited

U.S. PATENT DOCUMENTS

| | | | | |
|---|---|---|---|---|
| 3,879,292 A * | 4/1975 | McClive | .................. | 210/282 |
| 4,620,248 A | 10/1986 | Gitzendanner | ................. | 360/97 |
| 5,148,337 A | 9/1992 | Cullen et al. | ............... | 360/97.04 |
| 5,229,899 A | 7/1993 | Brown et al. | ............... | 360/97.02 |
| 5,392,177 A | 2/1995 | Chainer et al. | ............. | 360/97.02 |
| 5,743,942 A * | 4/1998 | Shelley et al. | .................. | 96/118 |
| 6,143,058 A | 11/2000 | Dahlgren et al. | ................. | 96/13 |
| 6,168,651 B1 | 1/2001 | Tuma et al. | ....................... | 95/90 |
| 6,188,688 B1 | 2/2001 | Buskirk, Jr. | .................. | 370/389 |

(Continued)

FOREIGN PATENT DOCUMENTS

JP           03184837 A  *  8/1991

OTHER PUBLICATIONS

Pope, D.E., et al., "Package Cracking in Plastic Surface Mount Components as a Function of Package Moisture Content and Geometry", Electronic Manufacturing Technology Symposium, 1988, 'Design-to-Manufacturing Transfer Cycle', Fifth IEEE/CHMT International, Publication Date:Oct. 10-12, 1988, pp. 89-92.

*Primary Examiner* — Will J Klimowicz
(74) *Attorney, Agent, or Firm* — Kunzler Law Group, PC (57) ABSTRACT

An apparatus, system, and method are disclosed for controlling out-gassing and humidity in a closed space-constrained environment. In particular, an environment control device is disclosed which is made using thermoforming techniques such that the walls of the device are much thinner than other conventional devices. This allows for the device to be used in space-constrained environment while still providing a sufficient amount of absorber material such as a desiccant. The apparatus includes a base made up of a thin flexible plastic film thermoformed to create a cavity having at least one wall, the cavity having an opening on one side. An absorber material, such as a desiccant, is placed inside the cavity, and a cover made up of a permeable layer sealed to the base opening to complete an enclosure for holding the absorber material.

24 Claims, 5 Drawing Sheets

U.S. PATENT DOCUMENTS

| | | | |
|---|---|---|---|
| 6,273,942 B1* | 8/2001 | Jersby | 96/118 |
| 6,296,691 B1* | 10/2001 | Gidumal | 96/17 |
| 6,618,222 B1 | 9/2003 | Watkins et al. | 360/97.02 |
| 6,643,093 B2 | 11/2003 | Brown et al. | 360/97.02 |
| 6,689,197 B2* | 2/2004 | Dick et al. | 96/118 |
| 6,716,276 B2* | 4/2004 | Loop et al. | 96/117.5 |
| 6,940,687 B2 | 9/2005 | Hong et al. | 360/97.02 |
| 7,130,149 B2 | 10/2006 | Hong et al. | 360/97.02 |
| 7,166,142 B2 | 1/2007 | Tuma et al. | 55/385.6 |
| 7,478,760 B2* | 1/2009 | Beatty et al. | 236/44 A |
| 2003/0218829 A1* | 11/2003 | Hong et al. | 360/97.02 |
| 2003/0227711 A1* | 12/2003 | Macpherson | 360/97.02 |
| 2004/0008613 A1* | 1/2004 | Beckwith et al. | 369/291 |
| 2004/0022676 A1* | 2/2004 | Hamilton et al. | 422/37 |
| 2004/0131805 A1* | 7/2004 | Merical et al. | 428/34.1 |
| 2006/0188688 A1 | 8/2006 | Sasaki et al. | 428/68 |
| 2006/0236868 A1* | 10/2006 | Pansegrouw et al. | 96/134 |
| 2007/0172557 A1* | 7/2007 | Simpson | 426/106 |
| 2007/0286928 A1* | 12/2007 | Sarmas et al. | 426/106 |
| 2008/0257151 A1* | 10/2008 | Mayer | 95/90 |
| 2009/0188386 A1* | 7/2009 | Beatty et al. | 95/91 |
| 2010/0282633 A1* | 11/2010 | Chau et al. | 206/524.3 |

* cited by examiner

APPARATUS, SYSTEM, AND METHOD FOR CONTROLLING OUT-GASSING AND HUMIDITY IN A CLOSED SPACE-CONSTRAINED ENVIRONMENT

BACKGROUND OF THE INVENTION

1. Field of the Invention

This invention relates to controlling humidity in a closed environment and more particularly relates to the use of versatile absorbers for controlling humidity in a product environment such as within the enclosure of a hard disk drive (HDD).

2. Description of the Related Art

Moisture sensitive products, including electronic products such as hard disk drives (HDD), typically require the use of some sort of absorbent material packaged within the products in order to prevent mechanical or electrical failure caused by condensation or contamination. In some cases, humidity and contamination can cause a loss of data, either by damaging the disk, damaging the head, or preventing the correct reading of the data on the disk by the head. The absorbent material is typically some type of desiccant such as silica gel, calcium sulfate, or montmorillonite clay. In the case of HDDs, it is imperative that the absorber material itself not interfere with the functionality of the HDD. Therefore, the absorber material is conventionally contained within a plastic outer package with a permeable membrane cover which is then secured within the HDD enclosure.

Because the physical size of HDDs is constantly decreasing due to the demand for smaller devices such as laptops and mp3 players, it has also become important that the absorbent material part not take up a large amount of space within the physical device. Typically, this is accomplished by simply scaling down known absorber material packages to fit within the shrinking space of an HDD enclosure. However, this approach also inherently leads to smaller amounts of absorber material fitting within the confines of the smaller packages. In some cases, the smaller amount of absorber material may be insufficient to reasonably manage the gases and humidity within the closed environment of the HDD.

For example, a laptop may be exposed to very high temperatures if left in a car during the summer, and conversely, the laptop may immediately be exposed to very low temperatures if the laptop is brought into an air-conditioned building. This may lead to the formation of condensation on the inside of the HDD as a result of the sudden temperature change. Thus, an absorber material placed inside the HDD regulates the amount of moisture and other gases within the HDD enclosure so as to prevent them from adversely affecting the operation of the HDD.

Because even very small particles of dust can inhibit the proper operation of a HDD, absorbent material packages must be clean. In other words, the packages must be constructed from materials which can be cleaned prior to their introduction into the HDD so as to avoid contamination within the enclosure. Conventional absorbent material packages typically utilize a material called polytetrafluoroethylene (ePTFE) for such clean applications.

In one conventional embodiment, the absorber material may be entirely enclosed within a package made from ePTFE laminate. In order to prevent tearing of the ePTFE laminate, a thickness of approximately 0.075 inches or more may be required. Furthermore, ePTFE laminate has limited elasticity. Thus, when a tablet form of the absorber material is used, the ePTFE laminate package may be susceptible to tearing or may be unable to compressively hold the tablet in position within an enclosure. ePTFE also has a very low coefficient of friction such that a part made with walls of ePTFE is not suitable to frictionally secure itself into a hole or enclosure. Additionally, the process of making packages entirely from ePTFE appears to be unsuitable for large scale or high speed operations.

In an alternative conventional embodiment, a package for holding the absorber material may be formed by using injection molding techniques. In this embodiment, a rigid base is formed by injecting molten plastic into a mold. Upon cooling, an absorber material, such as a desiccant tablet, is placed in the base, and an ePTFE cover is sealed to the base to complete the enclosure. Again, because the base is rigid and has little flexibility, it is typically unable to compressively hold itself in position and may require the use of a screw, spring, or some type of adhesive in order to fasten it into position. Although injection molding techniques can be carried out in multicavity hot runner molds, the tools are very expensive and must be replaced periodically.

One of the limitations of currently available methods for packaging an absorber material is the minimum thickness of the material being used. As the parts decrease in size, the space occupied by the walls of the part may occupy a large percentage of the total space allotted for the part, thereby leaving less space available for the absorber material.

For example, assume that the external dimensions of the part, in order to fit into a hard drive enclosure, must not exceed 10.0 mm (0.39 inches) in length, 10.0 mm (0.39 inches) in width, and 10.0 mm (0.39 inches) in height for a total volume of 1000 mm$^3$. Then the total interior volume of the part, or the amount of space available for occupation by the absorber material, becomes a function of the thickness of the material used to form the walls of the part. Thus, if the package is constructed from material that is approximately 2.0 mm (0.075 inches) thick, then the usable interior volume of the device (assuming a six wall enclosure made from materials of the same thickness) is approximately 216 mm$^3$. (10−2−2=6 and 6×6×6=216). This means that approximately 784 mm$^3$ is occupied by the wall forming material. Therefore, even with this simplified example, it is apparent that a reduction in the thickness of the walls may result in a dramatic increase of space available for the storage of the absorber material.

For instance, assume now that a part with the same restrictions listed above is made using material with a thickness of about 0.25 mm (0.010 inches). The interior volume now available inside the part for storage of the absorber material increases to approximately 857 mm$^3$. (9.5×9.5×9.5=857.375), while the amount of space occupied by the walls of the part decreases to approximately 143 mm$^3$. Thus, by reducing the wall thickness of materials used for holding an absorber material, it is possible to significantly increase the amount of absorber material contained inside the part without increasing the exterior size of the part. An additional drawback of conventional parts is that they may absorb vapors too rapidly for a particular application. For example, magnetic storage devices commonly employ a desiccant to protect against a rise in moisture during storage or operation, or to buffer the HDD enclosure at a specific humidity range during changes in temperature. However, typical absorber parts absorb vapors very rapidly such that they absorb significant amounts of vapor during time it takes to install the part into a sealed or semi-sealed environment.

Conventionally, the absorber parts are stored in protected containers or purged with dry gas prior to installation which takes place in a clean room environment. In some cases, attempts made to purge the part with dry gases are performed immediately after installation and just prior to sealing the closed environment. However, this method is often ineffective at sufficiently drying out the absorber material and can be costly. Therefore, by providing a way to restrictively control the rate of absorption, a part may be engineered such that it can be quickly installed without absorbing a substantial amount of ambient vapors while still providing the absorption rates necessary to perform in a closed environment.

SUMMARY OF THE INVENTION

From the foregoing discussion, it should be apparent that a need exists for an apparatus, system, and method that provides an absorber material part that is cleanable, can be produced in high volume, and has very thin walls. Beneficially, such an apparatus, system, and method would be used to control out-gassing and humidity in a closed space-constrained environment.

The present invention has been developed in response to the present state of the art, and in particular, in response to the problems and needs in the art that have not yet been fully solved by currently available absorber material parts. Accordingly, the present invention has been developed to provide an apparatus, system, and method for controlling out-gassing and humidity in a closed space-constrained environment that overcome many or all of the above-discussed shortcomings in the art.

The apparatus is provided with a base comprising a thin flexible plastic film thermoformed to create a cavity having at least one wall, the cavity having an opening on one side, the thickness of the film ranging between about 0.005 inches and about 0.075 inches; an absorber material placed inside the cavity; and a cover comprising a permeable layer sealed to the base opening to complete an enclosure for holding the absorber material, the permeable layer positioned between the closed environment and the absorber material and configured such that vapors pass through the permeable layer but the absorber material does not substantially pass through the permeable layer.

In one embodiment of the apparatus, the thin flexible plastic film may comprise glycol modified polyethylene terphthalate. In one embodiment, the thin flexible plastic film may comprise polycarbonate. In another embodiment, the base may be thermoformed by vacuum thermoforming. In yet another embodiment, the permeable layer may comprise expanded polytetrafluoroethylene (ePTFE).

In one embodiment of the apparatus, the thickness of the film ranges between about 0.005 inches and about 0.05 inches. In another embodiment, the thickness of the film ranges between about 0.005 inches and about 0.03 inches, and in yet another embodiment, the thickness of the film ranges from about 0.005 inches and about 0.02 inches.

In a further embodiment of the apparatus, the cover is sealed to the base by heat melting, and in another embodiment, the cover is sealed to the base by an adhesive layer between the cover and the base.

In various embodiments of the apparatus, the absorber material may comprise a desiccant, and in at least one embodiment, the absorber material may comprise silica gel. In further embodiments, the absorber material may comprise activated carbon, and in various embodiments, the absorber material may be in tablet form.

In one embodiment, the thin flexible plastic film is substantially resistant to water permeation.

In one embodiment, the apparatus further comprises a restrictive layer positioned across the permeable layer of the cover, the restrictive layer comprising a substantially impermeable material with at least one opening for restrictively exposing the permeable layer to the closed space-constrained environment.

A system of the present invention is also presented for controlling out-gassing and humidity in a closed space-constrained environment. In particular, the system, in one embodiment, includes a hard disk drive contained within a closed environment; and an environment control device positioned within the closed environment, the environment control device comprising: a base comprising a thin flexible plastic film thermoformed to create a cavity having at least one wall, the cavity having an opening on one side, the thickness of the film ranging between about 0.005 inches and about 0.075 inches; an absorber material placed inside the cavity; and a cover comprising a permeable layer sealed to the base opening to complete an enclosure for holding the absorber material, the permeable layer positioned between the closed environment and the absorber material and configured such that vapors pass through the permeable layer but the absorber material does not substantially pass through the permeable layer.

A method of the present invention is also presented for manufacturing a device for controlling out-gassing and humidity in a closed space-constrained environment. The method in the disclosed embodiments substantially includes the steps necessary to carry out the functions presented above with respect to the operation of the described apparatus and system.

In one embodiment, the method includes heating a thin flexible plastic film; positioning the film across a mold, a surface of the mold defining physical contours for a plurality of base molds; forcing the film against the mold such that the film takes the shape of the mold thereby forming a plurality of bases within the film, each of the bases comprising a cavity having at least one wall and an opening on one side, the thickness of the at least one wall ranging between about 0.005 inches and about 0.075 inches; cooling the film such that the film substantially retains the shape of the surface of the mold; placing an absorber material inside the cavity of each of the plurality of bases formed within the film; sealing a cover across the openings of each of the plurality of bases formed within the film to complete an enclosure for holding the absorber material, the cover comprising a permeable layer configured such that vapors pass through the permeable layer but the absorber material does not substantially pass through the permeable layer; and detaching each of the enclosures from the film.

The method also may include various embodiments wherein the thin flexible plastic film comprises glycol modified polyethylene terphthalate; wherein the film is forced against the mold by vacuum; or wherein the permeable layer comprises expanded polytetrafluoroethylene (ePTFE).

In a further embodiment, the thickness of the film ranges between about 0.005 inches and about 0.05 inches. In another embodiment, the thickness of the film ranges between about 0.005 inches and about 0.03 inches, and in yet another embodiment, the thickness of the film ranges from about 0.005 inches and about 0.02 inches.

In other various embodiments, the absorber material may comprise a desiccant, and in at least one embodiment, may comprise silica gel.

In one embodiment, the method further comprises positioning a restrictive layer across the permeable layer of the cover, the restrictive layer comprising a substantially impermeable material with at least one opening for restrictively exposing the permeable layer to the closed space-constrained environment.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of materials, combinations of materials, shapes, and sizes, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1A:
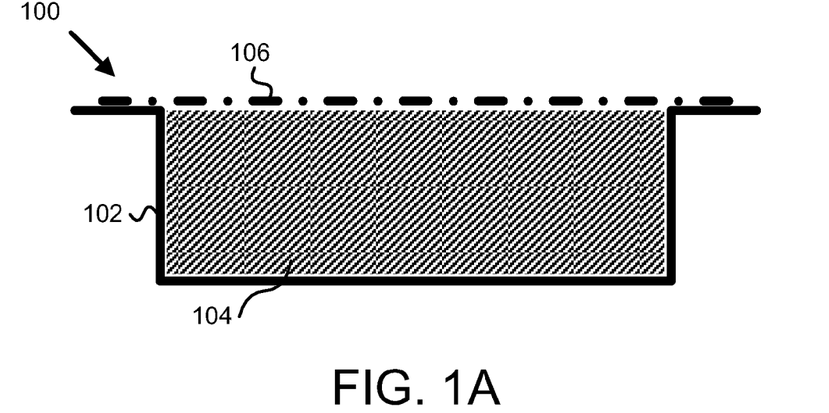
FIG. 1A illustrates one embodiment of an apparatus to control out-gassing and humidity in a closed space-constrained environment in accordance with the present invention.

FIG. 1A illustrates one embodiment of an apparatus 100 to control out-gassing and humidity in a closed space-constrained environment in accordance with the present invention. The apparatus 100 includes base 102, an absorber material 104, and a cover 106.

The base 102, in one embodiment, is made from a thin flexible plastic film thermoformed to create a cavity having at least one wall. The cavity preferably has an opening on one side, and the thickness of the film typically ranges between about 0.005 inches and about 0.075 inches. An absorber material 104 is placed inside the cavity, and a cover 106 comprising a permeable layer is sealed across the base opening to complete an enclosure for holding the absorber material 104. In one embodiment, the permeable layer is positioned between the closed space-constrained environment and the absorber material 104 such that vapors pass through the permeable layer but the absorber material 104 does not substantially pass through the permeable layer.

Thermoforming allows for the use of very thin plastic films such that in various embodiments, the thickness of the film may be minimized while significantly increasing the interior volume of the apparatus 100. Thermoforming is a manufacturing process wherein a sheet of plastic is heated between infrared, natural gas, or other types of heaters until the plastic reaches its forming temperature. Then, the sheet is stretched over or into a temperature-controlled, surface mold. The sheet is typically held against the mold surface until it becomes sufficiently cooled to retain the shape of the mold. In various embodiments, numerous parts are formed simultaneously and the formed parts are each trimmed from the sheet. Various examples of thermoforming include vacuum forming, pressure forming, twin-sheet forming, drape forming, free blowing, and simple sheet bending. Vacuum forming is a simplified version of thermoforming, whereby the sheet of heated plastic is held against the mold by applying vacuum between the mold surface and the sheet.

In various embodiments, the thin flexible plastic film used to form the base 102 preferably has a high degree of resistance to water permeation. For example, in one embodiment, a material such as glycol modified polyethylene terphthalate may be used, or in other embodiments, the material may include a polymer of chloro trifluroroethylene or a composite material having a layer of chlorotrifluoroethylene (Kel-F). In at least one embodiment, the material may comprise polycarbonate. Polycarbonate is preferable in some embodiments because it has a high temperature limit before warping occurs. For example, in a HDD where the temperature can become very high, polycarbonate may resist warping that may cause the apparatus 100 to become loose or lose functionality. One skilled in the art will recognize that there are other materials with high degrees of resistance to water permeation that may be used as well. Conversely, in some embodiments, a material may be selected for having a low degree of resistance to water permeation. An example of such a material is a polyamide.

Preferably, the material selected is compatible with thermoforming uses at thicknesses ranging as small as between 0.005 inches and 0.02 inches. However, in various embodiments, the minimum thickness may be as great as 0.03 inches, 0.05 inches, or 0.075 inches.

The absorber material 104, in one embodiment, may be a desiccant and is preferably a material such as silica gel, alumina gel, silica/alumina gel, activated carbon, or other similar material that can absorb vapors such as water vapor, organic vapors, and/or corrosive gases. Further examples of the absorber material 104 may include zeolite, metal salts such as potassium carbonate and other carbonates, iron sulfate or other sulfates, calcium oxide or other metal oxides, activate d metals, polymeric amines, polymeric acids, and other similar materials as will be recognized by one of skill in the art. In one embodiment, activated carbon is preferably utilized to absorb organic materials or silicons.

In various embodiments, the absorber material 104 may be configured to absorb a plurality of vapor types and may be composed of one or more materials. For example, in one embodiment, both silica gel and activated carbon may be combined as they have complimentary absorption properties. Activated carbon can be used for both absorbing water at high relative humidity as well as absorbing organic contaminants. Furthermore, if the materials are treated with some basic component such as sodium carbonate, the absorber will also absorb corrosive gases such as SO2.

In at least one embodiment, the absorber material 104 is provided in tablet form such that the absorber material retains its shape. The tablet form of the absorber material 104 is preferable in many applications, because it is easy to handle and can be used to compressively hold the walls of the base 102 against the interior walls of a small space thereby securing the part into position. In other embodiments, the absorber material 104 may be in other forms such as powder, gels, sheets, pellets, or grains.

Preferably, the form of the absorber material 104 substantially prevents the absorber material from passing through the permeable layer of the cover 106. In this manner, the material is securely kept within the enclosure formed by the base 102 and the cover 106 such that the material cannot significantly spread to the other portions of the closed space-constrained environment. For example, if the absorber material 104 is placed inside a hard disk drive (HDD) enclosure, the absorber material 104 would be prevented from contaminating the hard disk surface which may cause electrical or mechanical failure. An example of typical restriction with regard to electronics is that particles of the absorbent material 104 greater than about 0.4 µm not escape through the cover 106 into the closed environment.

The cover 106 is preferably sealed across the opening of the base 102 such that the absorber material 104 is sealed inside the formed enclosure. In a preferred embodiment, the permeable layer of the cover 106 is made from expanded polytetrafluoroethylene (ePTFE). Polytetrafluoroethylene (PTFE) is a synthetic fluoropolymer commonly known as Teflon. PTFE has an extremely low coefficient of friction and is very non-reactive. PTFE can be expanded to form the more permeable ePTFE which is particularly suitable for use with the present invention. As will be recognized by one of skill in the art, other polymers similar to PTFE may also be used such as fluorinated ethylene-propylene (FEP) and perfluoroalkoxy polymer resin (PFA). In various applications, other permeable materials not listed here may be used as well.

In various embodiments, the cover 106 may be sealed to the base by heat melting, ultrasonic welding, frictional welding, an adhesive, or other method as recognized by those of skill in the art.

Figure 1B:
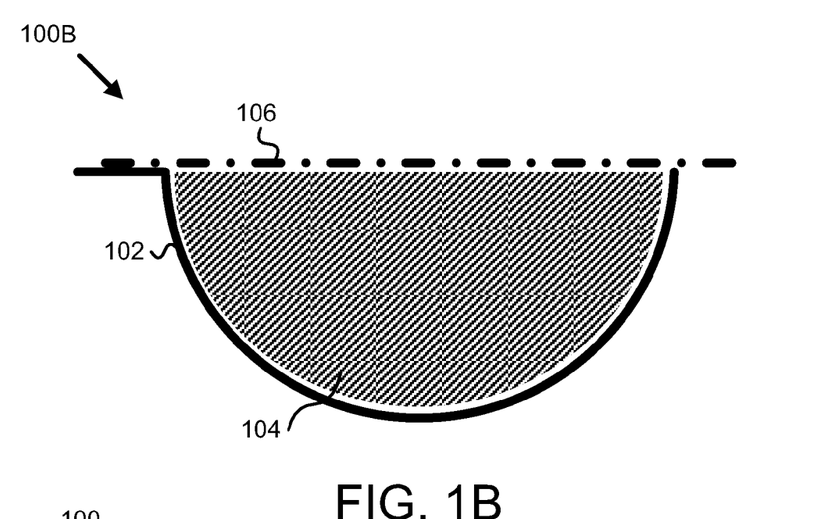
FIG. 1B illustrates an additional embodiment of an apparatus to control out-gassing and humidity in a closed space-constrained environment in accordance with the present invention.
Figure 1C:
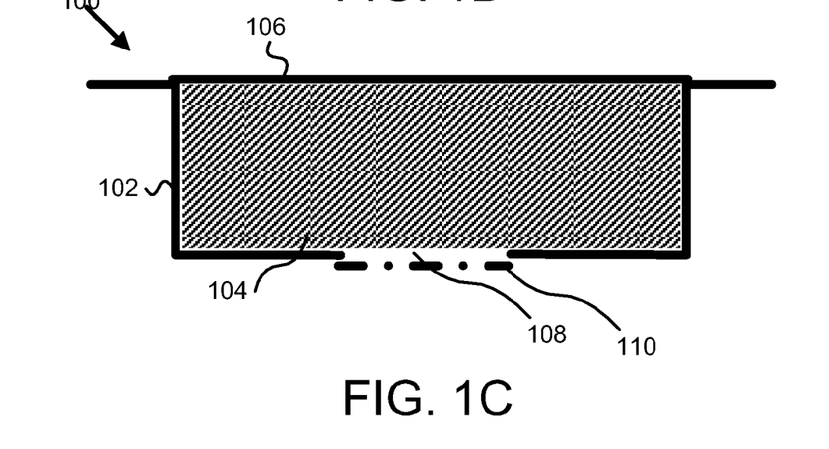
FIG. 1C illustrates an additional embodiment of an apparatus to control out-gassing and humidity in a closed space-constrained environment in accordance with the present invention.

FIG. 1C depicts an alternate embodiment wherein the cover 106 may be formed out of a substantially impermeable material, such as the same material used to form the base 102 (ie: polycarbonate). In such an embodiment, the cover 106 and the base 102 will form an enclosure formed completely from the substantially impermeable material. The absorber material 104 is preferably placed inside the enclosure before the cover 106 is sealed to the base 102.

In one embodiment, an opening 108 may be formed on the side or bottom of the base walls 102, and a permeable material 110 may be provided over the opening 108 to provide a breathable interface with an external environment through the permeable material 110. Such an embodiment may allow the apparatus 100 to be oriented and secured in an alternate manner. For example, if the apparatus 100 is pressed into a cavity, a flange formed where the base 102 is sealed to the cover 106 may cause an interference with a cavity wall, thereby securing the apparatus 100 into position. In one embodiment, the size of the formed opening 108 may also provide a restriction on the flow rate of vapors into and out of the apparatus 100 such that the flow rate may be adjusted by adjusting the size of the opening 108.

FIG. 1B illustrates an additional embodiment of an apparatus 100B to control out-gassing and humidity in a closed space-constrained environment in accordance with the present invention. The apparatus 100B includes a base 102, an absorber material 104, and a cover 106 with substantially the same embodiments described above with regard to FIG. 1. However, with regard to the apparatus 100B, base 102 is formed in a substantially different shape with only a single rounded wall. The rounded wall of the base 102 is preferably formed using the thermoforming techniques described above, an absorber material 104 is placed inside the base 102, and the cover 106 is sealed to the opening of the base 102. In various embodiments, apparatus 100 and 100B may be provided in different shapes and sizes depending on the intended application of the apparatus 100 and 100B.

Figure 2:
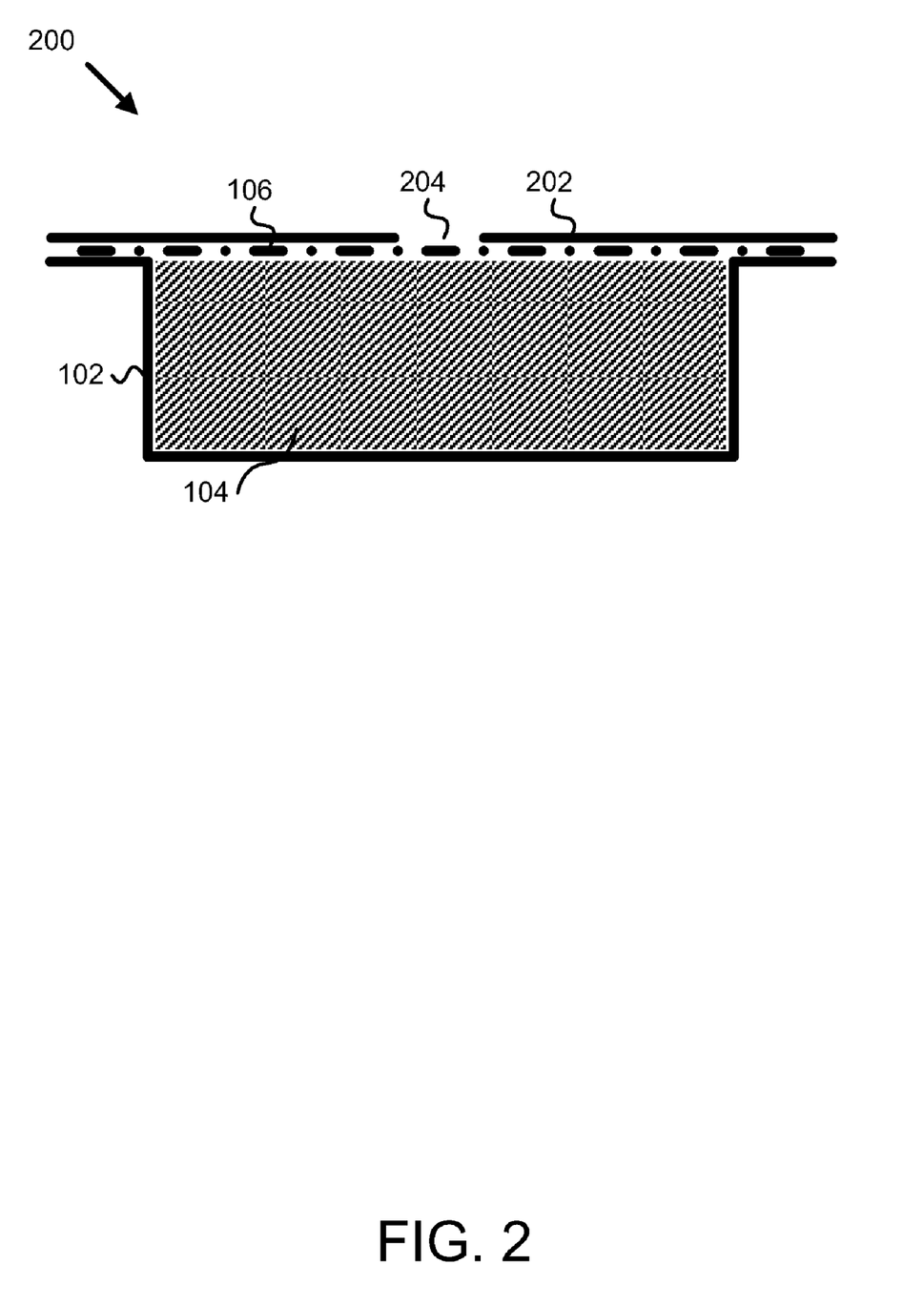
FIG. 2 illustrates one embodiment of an apparatus to control out-gassing and humidity in a closed space-constrained environment with a restrictive cover in accordance with the present invention.

FIG. 2 illustrates one embodiment of an apparatus 200 to control out-gassing and humidity in a closed space-constrained environment with a restrictive cover 202 in accordance with the present invention. The apparatus 200 includes a base 102, an absorber material 104, and a cover 106 as described above. However, the apparatus 200 includes a restrictive cover 202 comprising a restrictive layer positioned across the permeable layer of the cover 106, wherein the restrictive layer comprises a substantially impermeable material with at least one opening 204 for restrictively exposing the permeable layer of the cover 106 to the environment.

In various embodiments, a varying number of openings 204 may be provided to restrictively control the rate at which the absorber material 104 absorbs vapors through the permeable material of the cover 106. In other embodiments, the size of the opening 204 may be adjusted to restrictively control the absorption rate. Typically, as soon as an absorber material 104 is exposed to the environment, it begins to absorb vapors until it reaches equilibrium with the environment. Thus, the implementation of more openings 204 or a smaller opening 204 will increase the amount of time it takes for the absorber material 104 to reach its vapor content equilibrium.

In an alternate embodiment, the restrictive cover 202 may be provided such that the opening of the base 102 is completely sealed by the restrictive cover 202, and one or more openings (not shown) may be subsequently provided through the exterior of the base 102 to control the absorption rate. For example, a small hole or plurality of holes may be engineered into the base 102 such that when the holes are covered by some permeable material such as ePTFE, the absorption rate may be restrictively controlled by the size and number of openings formed in the base 102.

In one embodiment, the restrictive cover 202 is selectively engineered such that the apparatus 200 has a restricted absorption rate such that the apparatus 200 can be removed from a protective package or enclosure and placed inside a sealed or semi-sealed enclosure, such as an HDD enclosure, prior to the absorption material 104 substantially reaching an equilibrium with the non-closed or open environment. In other words, because of the restrictive cover 202, the absorber material 104 will remain dryer during installation of the apparatus 200. This may eliminate or reduce the need to re-dry the absorber material 104 just prior to sealing the closed environment. Such restriction is preferably sufficient to allow the absorber material 104 to be exposed during manufacturing without degrading the capacity needed for performance in the HDD. The restriction does not prevent the absorber material 104 from performing its purpose of absorbing and controlling the moisture which penetrates into an HDD enclosure via gaskets, seals, or breather channels.

In other various embodiments, a restrictive cover 202 may be utilized with other types of moisture control devices such as those used to protect foodstuffs, medicines, and general consumer goods during shipping and storage. In such applications, a restrictive layer 202 may be attached to or around a pre-existing desicant device so as to control the absorption rate of the device. For example, it may be desirable to restrictively control the absorption rate of a moisture control device inside a package of food. In such an embodiment, a restrictive cover 202 may be utilized in connection with pre-existing devices to satisfy absorption control constraints and requirements. In one embodiment, the restrictive layer 202 may encapsulate the entire pre-existing desicant device such that the restrictive layer 202 controls the absorption rate of the device by restricting the flow of humidity and other contaminants that reach the absorber material of the device.

Figure 3A:
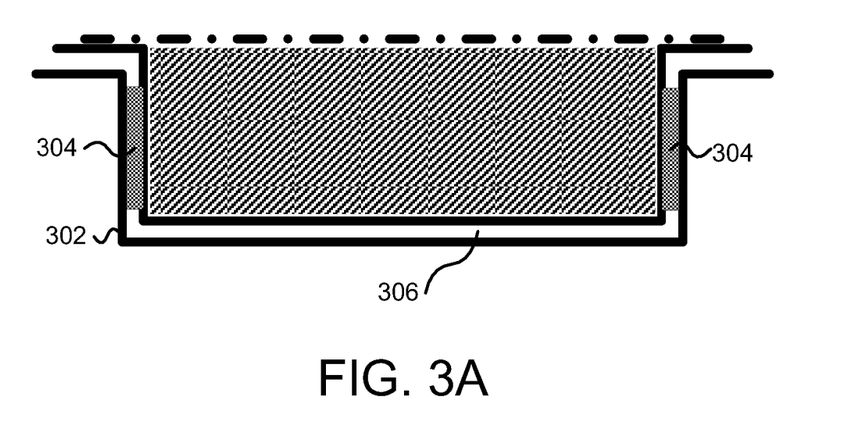
FIG. 3A illustrates one embodiment of an apparatus to control out-gassing and humidity secured by holding ridges in a closed space-constrained environment in accordance with the present invention.

FIG. 3A illustrates one embodiment of an apparatus 100 to control out-gassing and humidity secured into a space-constrained environment enclosure 302 by holding ridges 304 in accordance with the present invention. In various embodiments, the holding ridges 304 are formed integrally with the interior side of the enclosure wall 302. The holding ridges 304 are typically formed out of a rigid or semi-rigid material such as metal or plastic and with a friction coefficient sufficient to frictionally engage the base 102 of the apparatus 100. However, is some embodiments the holding ridges 304 may be formed from less rigid material as long as the holding ridges 304 are formed to sufficiently secure the apparatus 100 into place. In one embodiment, the apparatus 100 is preferably configured to substantially fit into the confined space 306 such that the outside walls of the base 102 frictionally interfere with the holding ridges 304 and such that additional adhesives or securing mechanisms are not required. In one embodiment, holding ridges 304 may not be needed and the apparatus 100 may be secured in place by frictional interference between the enclosure walls 302 and the base walls 102. In a further embodiment, a ridge or blister 304 may be formed on the side of the base walls 102 such that the "springiness" of the material used to form the base 102, such as polycarbonate, causes an interference with the enclosure wall 302 such that the apparatus 100 is held securely in place. In one embodiment, the blister may be formed as part of the thermoforming process such that the blister is integrated into the base walls 102.

Figure 3B:
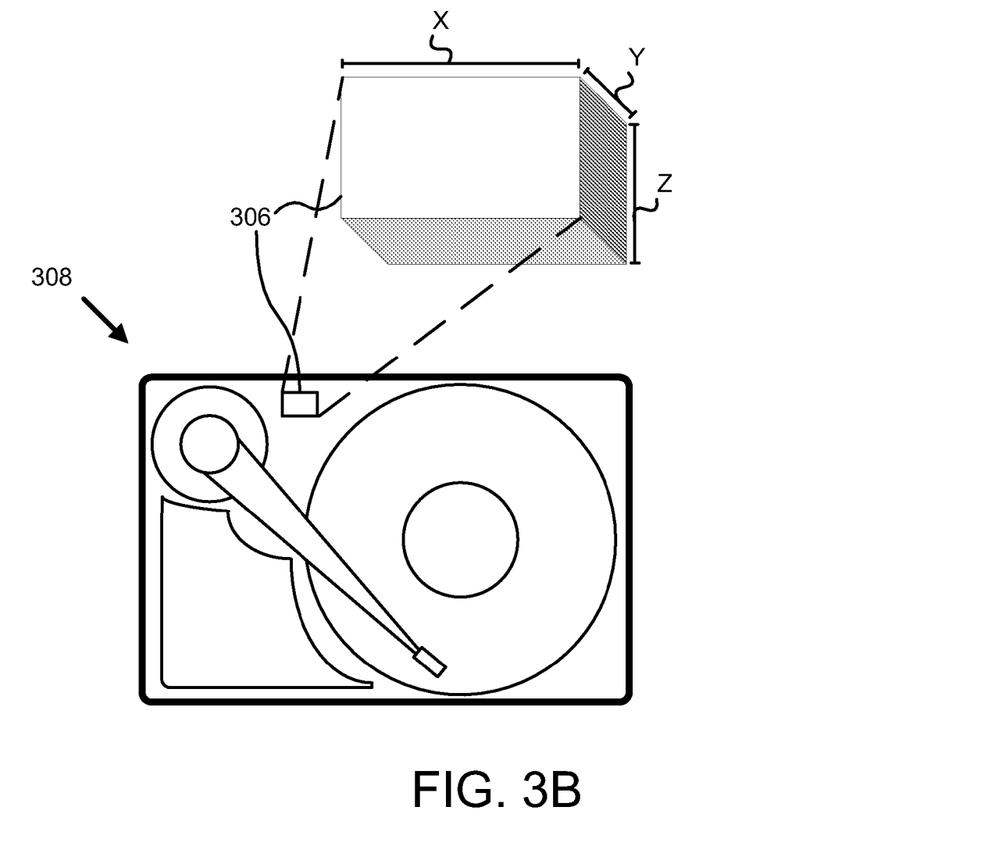
FIG. 3B illustrates one embodiment of a closed space-constrained environment.

FIG. 3B illustrates one embodiment of a closed space-constrained environment 308. In this case an HDD enclosure is provided, however one of skill the art will recognize that numerous other applications could benefit from the use of the apparatus 100, and in particular other electronic devices such as cell phones, mp3 players, personal digital assistants, etc. could benefit from the use of the apparatus 100.

The closed space-constrained environment 308 includes a confined space 306 for receiving the apparatus 100 during installation. Because the apparatus 100 is made using thermoforming techniques to create very thin walls in the base 102, it is able to fit into the confined space 306 while still providing a sufficient amount of absorber material 104 for controlling out-gassing and humidity within the closed space-constrained environment 308.

In various embodiments, the confined space 306 may have differing space limitations. In one embodiment, the confined space 306 may simply be constrained to a particular volume regardless of the dimensions of the apparatus 100 to be installed. In other embodiments, the confined space 306 may be precisely limited to a particular three dimensional space such as defined by a dimension X, dimension Y, and dimension Z. In the various embodiments, the confined space 306 may be provided in differing shapes and sizes as is required by the desired application.

In at least one embodiment, the constrained space 306 is formed such that holding ridges 304 protrude from one or more sides of the space constrained environment enclosure 302. The ridges 304 enable the walls of the apparatus 100 to frictionally compress against the walls of the enclosure 302 such that the apparatus 100 is secured into place. In one embodiment, a tablet is used as the absorber material 104 and is substantially rigid such that it presses the walls of the apparatus 100 against the holding ridges 304 in order to facilitate securing the apparatus 100 into the confined space 306. In further embodiments, the apparatus 100 may be secured in place by alternate or additional means such as the use of adhesives.

Typically, once installation of the apparatus 100 is complete, the closed environment 308 is sealed or semi-sealed such that the interior space of the enclosure 308 is substantially separated from the environment outside the enclosure 308. In particular, vapors and gases may be wholly or partially prevented from entering the enclosure 308.

Figure 4:
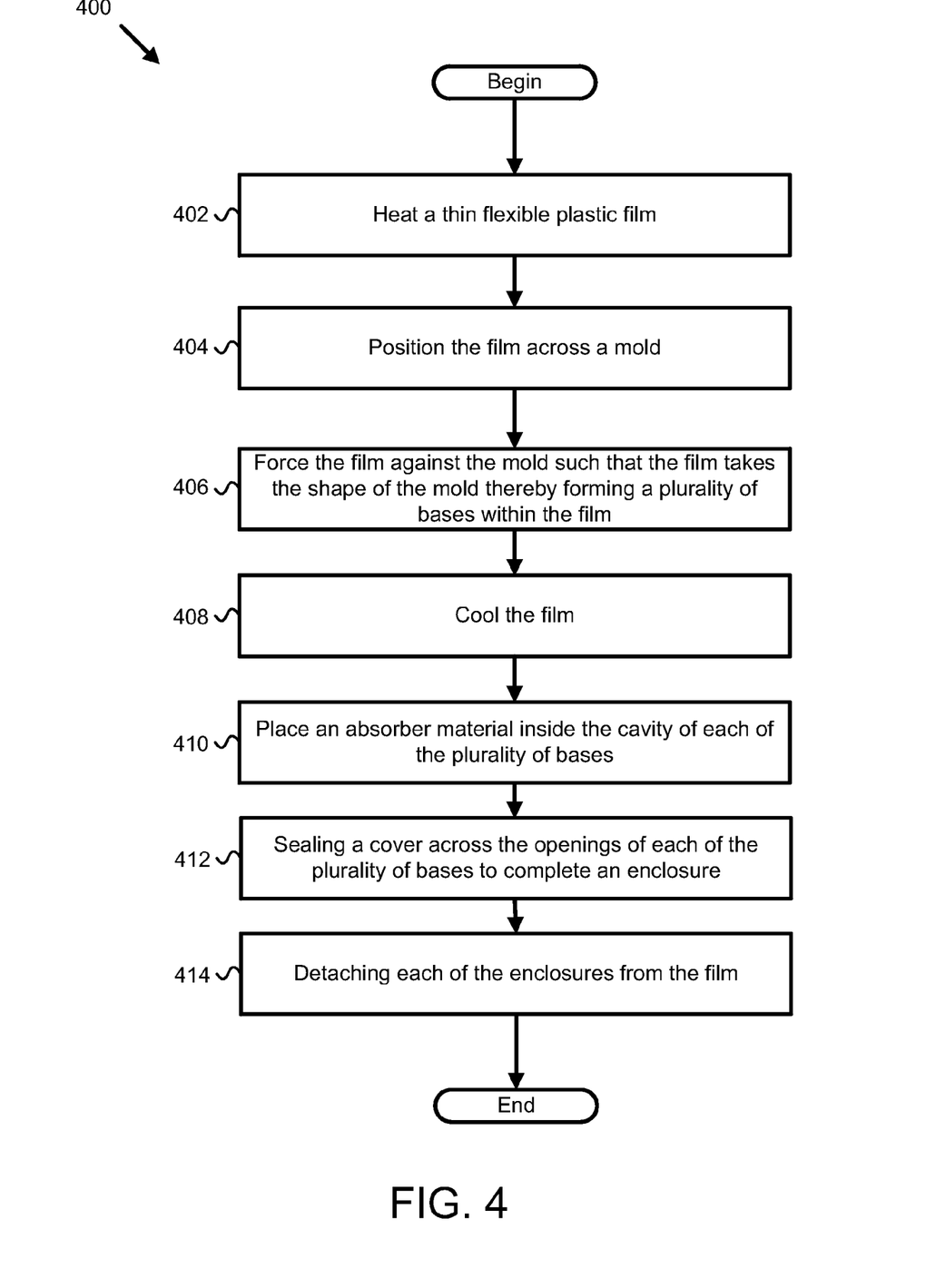
FIG. 4 is a schematic flow chart diagram illustrating one embodiment of a method for manufacturing a device for controlling out-gassing and humidity in a closed space-constrained environment in accordance with the present invention.

FIG. 4 is a schematic flow chart diagram illustrating one embodiment of a method 400 for manufacturing a device for controlling out-gassing and humidity in a closed space-constrained environment 308 in accordance with the present invention. The method 400 substantially includes the embodiments and limitations described above with regard to the apparatus 100. The method 400 begins by heating 402 a thin-flexible plastic film to a temperature at which the film becomes malleable. In one embodiment, a material such as glycol modified polyethylene terphthalate may be used, or in other embodiments, the material may include a polymer of chloro trifluroroethylene or a composite material having a layer of chlorotrifluroroethylene. In at least one embodiment, the material may comprise polycarbonate.

The film is positioned 404 across a mold wherein a surface of the mold defines physical contours for a plurality of base molds. Next, the film is forced 406 against the mold such that the film takes the shape of the mold thereby forming a plurality of bases 102 within the film. Preferably, each of the bases 102 comprises a cavity having at least one wall and an opening on one side. The thickness of the wall typically ranges from between about 0.005 inches and about 0.075 inches. Preferably the film is forced 406 against the mold by a vacuum.

The film is then cooled 408 such that the film substantially retains the shape of the surface of the mold. An absorber material 104 is placed 410 inside the cavity of each of the plurality of bases 102 formed within the film. The absorber material 104, in one embodiment, may be a desiccant and is preferably a material such as silica gel, alumina gel, silica/alumina gel, activated carbon, or other similar material that can absorb a vapors such as water vapor, organic vapors, and/or corrosive gases. Further examples of the absorber material 104 may include zeolite, metal salts such as potassium carbonate and other carbonates, iron sulfate or other sulfates, calcium oxide or other metal oxides, activate d metals, polymeric amines, polymeric acids, and other similar materials as will be recognized by one of skill in the art.

Then, a cover 106 is sealed 412 across the openings of each of the plurality of bases formed within the film to complete an enclosure 100 for holding the absorber material 104. The cover 106 typically comprises a permeable layer configured such that vapors pass through the permeable layer but the absorber material 104 does not substantially pass through the permeable layer. Preferably, the permeable is comprised of a material such as ePTFE.

Finally, each of the enclosures 100 is detached from the film. The method 400 ends. The enclosures 100 may then be installed or placed into a closed environment 308 such as an HDD enclosure.

Figure 5:
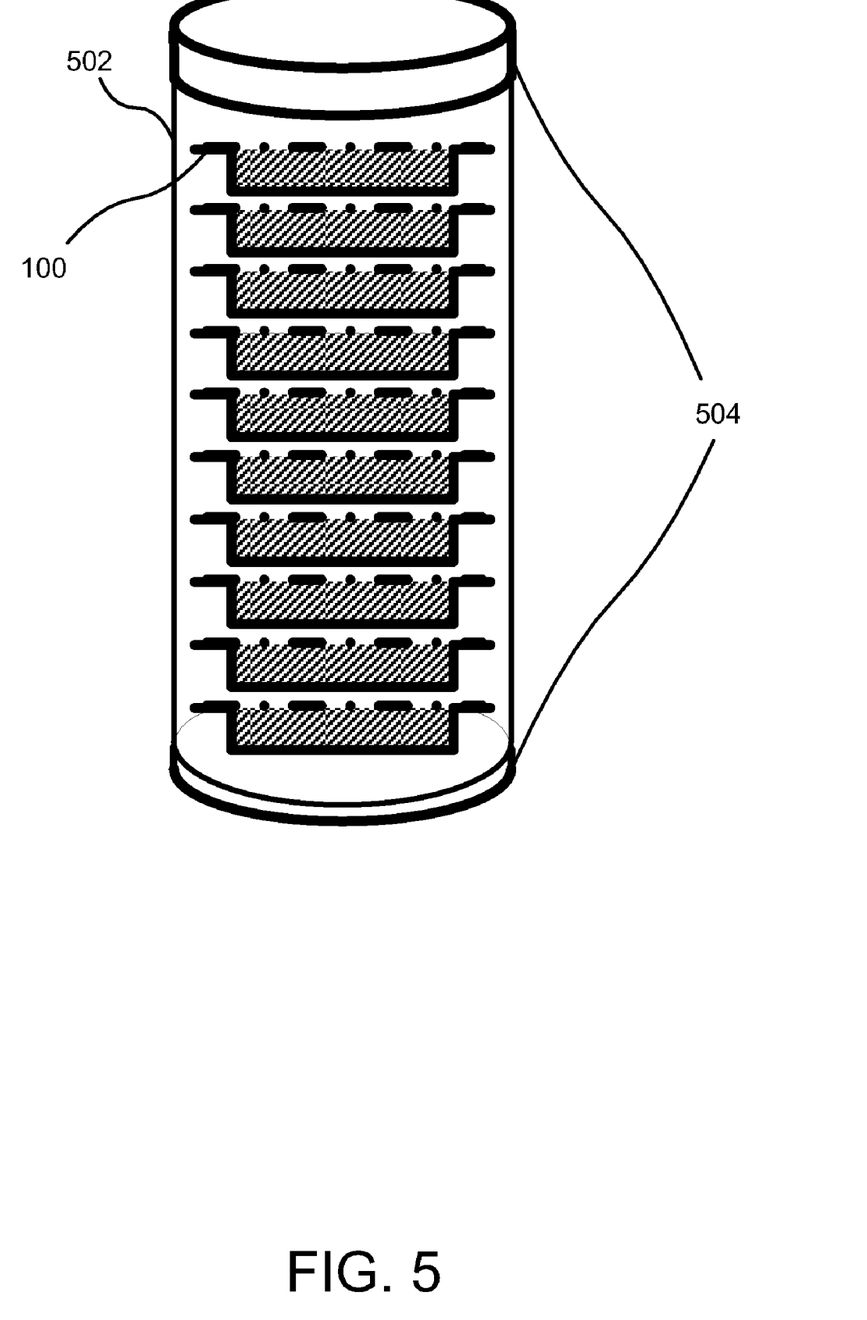
FIG. 5 illustrates one embodiment of a shipping device for protectively shipping an apparatus to control out-gassing and humidity in a closed space-constrained environment.

FIG. 5 illustrates one embodiment of a shipping device 502 for protectively shipping an apparatus 100 to control out-gassing and humidity in a closed space-constrained environment. The shipping device 502 is preferably substantially rigid and tubular shaped for efficiently storing and protecting a plurality of apparatuses 100 stored therein. In one embodiment, the shipping device 502 is formed to substantially reflect the shape of the apparatuses 100 stored with the shipping device 502. In various embodiments, the shipping device 502 may include end caps 504 for sealing the ends of the shipping device 502 and protecting the apparatuses 102 during shipping or storage.

For example, the apparatuses 100 may be formed in square, rectangular, or triangular shapes depending on their intended application. Thus, a shipping device 502 may be provided with substantially the same radial shape as the apparatuses 100 in order to efficiently and securely contain the apparatuses 100 such that they are protected during shipping and prior to their use.

Such a shipping device 502 is possible for use with the disclosed apparatuses 100 because of the compressive tolerance associated with the apparatuses 100. For example, conventional devices for controlling humidity are typically made of rigid bases or flexible bases that lack a significant restoring force. The lack of flexibility associated with the conventional devices is often prohibitive of the use of a rigid shipping device 502 because conventional rigid bases may be damaged if compressed into a rigid shipping device 502. For example, the hard plastic base of one part may damage the soft cover of another part on which it is stacked, which may compromise the ability of the part to contain an absorber material. Furthermore, rigid plastic parts that move against each other can fret or wear, causing particles to form that can contaminate or interfere with the operation of a final product.

Additionally, a uniform number of devices per shipping device 502 may not be attainable where there is variance in the thickness of the conventional rigid devices. For example, because of a difference in part thickness, 50 parts may securely fit into one shipping device 502, whereas only 49 may securely fit into another shipping device 502 of the same size. Furthermore, conventional flexible devices without a significant restoring force may be compressed into a rigid shipping device 502, but once compressed, may leave gaps in the shipping device 502 such that the contents are not secure within the shipping device 502, thereby leading to possible damage caused by movement during shipping and handling.

However, the presently disclosed apparatus 100 is formed using thermoforming techniques and materials that provide enough flexibility and restoring force such that the apparatuses 100 may be compressively stored in the shipping device 502. The 'springiness' of the apparatuses 100 allows for a uniform number of apparatuses to be stored in each shipping device 502 and provides the necessary compression for securely holding the apparatuses 100 in place during shipping. Furthermore, the shipping device 502 protects the environment of the apparatuses 100 such they are not contaminated prior to installation. Additionally, the shipping device 502 may be configured for efficient use in an automated installation system, or may be configured to facilitate efficient manual dispensing of the apparatuses 100. Furthermore, the shipping device 502, in one embodiment may be used as part of a protective parts loading system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to control out-gassing and humidity in a closed space-constrained environment, the apparatus comprising:

a base comprising a thin flexible plastic film thermoformed to create a cavity having at least one wall and a single open side defining an opening, the thickness of the film ranging between about 0.005 inches and about 0.075 inches, wherein the thin flexible plastic film comprises an impermeable material;

an absorber material placed inside the cavity; and a cover comprising a permeable layer sealed to the base opening to complete an enclosure for holding the absorber material, the permeable layer positioned between the closed space-constrained environment and the absorber material and configured such that vapors pass through the permeable layer but the absorber material does not substantially pass through the permeable layer, wherein the permeable layer comprises a permeable material.

2. The apparatus of claim 1, wherein the impermeable material comprises glycol modified polyethylene terphthalate.

3. The apparatus of claim 1, wherein the permeable material comprises expanded polytetrafluoroethylene (ePTFE).

4. The apparatus of claim 1, wherein the thickness of the film ranges between about 0.005 inches and about 0.05 inches.

5. The apparatus of claim 1, wherein the thickness of the film ranges between about 0.005 inches and about 0.03 inches.

6. The apparatus of claim 1, wherein the thickness of the film ranges between about 0.005 inches and about 0.02 inches.

7. The apparatus of claim 1, wherein the cover is sealed to the base by heat melting.

8. The apparatus of claim 1, wherein the cover is sealed to the base by an adhesive layer between the cover and the base.

9. The apparatus of claim 1, wherein the absorber material comprises a desiccant.

10. The apparatus of claim 1, wherein the absorber material comprises silica gel.

11. The apparatus of claim 1, wherein the absorber material comprises activated carbon.

12. The apparatus of claim 1, wherein the absorber material is in tablet form.

13. The apparatus of claim 1, wherein the thin flexible plastic film is substantially resistant to water permeation.

14. The apparatus of claim 1, further comprising a restrictive layer positioned across the permeable layer of the cover, the restrictive layer comprising a substantially impermeable material with at least one opening for restrictively exposing the permeable layer to the closed space-constrained environment.

15. A method of manufacturing a device for controlling out-gassing and humidity in a closed space-constrained environment, the method comprising:

heating a thin flexible plastic film comprising an impermeable material;

positioning the film across a mold, a surface of the mold defining physical contours for a plurality of base molds;

forcing the film against the mold such that the film takes the shape of the mold thereby forming a plurality of bases within the film, each of the bases comprising a cavity having at least one wall and an opening on one side, the thickness of the at least one wall ranging between about 0.005 inches and about 0.075 inches;

cooling the film such that the film substantially retains the shape of the surface of the mold;

placing an absorber material inside the cavity of each of the plurality of bases formed within the film;

sealing a cover across the openings of each of the plurality of bases formed within the film to complete an enclosure for holding the absorber material, the cover comprising a permeable layer configured such that vapors pass through the permeable layer but the absorber material does not substantially pass through the permeable layer; and detaching each of the enclosures from the film.

16. The method of claim 15, wherein the thin flexible plastic film comprises glycol modified polyethylene terphthalate.

17. The method of claim 15, wherein the film is forced against the mold by vacuum.

18. The method of claim 15, wherein the permeable layer comprises expanded polytetrafluoroethylene (ePTFE).

19. The method of claim 15, wherein the thickness of the at least one wall ranges between about 0.005 inches and about 0.05 inches.

20. The method of claim 15, wherein the thickness of the at least one wall ranges between about 0.005 inches and about 0.03 inches.

21. The method of claim 15, wherein the absorber material comprises a desiccant.

22. The method of claim 15, further comprising positioning a restrictive layer across the permeable layer of the cover, the restrictive layer comprising a substantially impermeable material with at least one opening for restrictively exposing the permeable layer to the closed space-constrained environment.

23. A system for controlling out-gassing and humidity in a closed space-constrained environment, the system comprising:

a hard disk drive contained within a closed environment; and an environment control device positioned within the closed environment, the environment control device comprising:

a base comprising a thin flexible plastic film thermoformed to create a cavity having at least one wall and a single open side defining an opening, the thickness of the film ranging between about 0.005 inches and about 0.075 inches, wherein the thin flexible plastic film comprises an empermeable material;

an absorber material placed inside the cavity;

a cover sealed to the base opening to complete an enclosure for holding the absorber material;

at least one opening formed on the exterior of the enclosure for restrictively exposing the absorber material to the closed space-constrained environment; and a permeable layer of material sealed across the at least one opening and configured such that vapors pass through the permeable layer but the absorber material does not substantially pass through the permeable layer.

24. The system of claim 23, further comprising a substantially rigid, tubular shipping device configured to compressively secure, store, and dispense a uniform number of environmental control devices.

* * * * *

UNITED STATES PATENT AND TRADEMARK OFFICE
CERTIFICATE OF CORRECTION

| | | |
|---|---|---|
| PATENT NO. | : 8,254,055 B2 | Page 1 of 1 |
| APPLICATION NO. | : 11/934571 | |
| DATED | : August 28, 2012 | |
| INVENTOR(S) | : Charles A. Brown | |

It is certified that error appears in the above-identified patent and that said Letters Patent is hereby corrected as shown below:

Column 14, Line 47

"an empermeable material" should read "an impermeable material"

Signed and Sealed this
Sixth Day of November, 2012

David J. Kappos
*Director of the United States Patent and Trademark Office*